US006668496B1

(12) United States Patent
Clapp et al.

(10) Patent No.: US 6,668,496 B1
(45) Date of Patent: Dec. 30, 2003

(54) METAL-FRAMED, FACTORY-ASSEMBLED, AND ROAD-TRANSPORTABLE BUILDING HAVING NO FLOOR, AND THE METHOD OF TRANSPORTING THE SAME

(76) Inventors: Guy C. Clapp, 5412 Hidden Oaks La., Arlington, TX (US) 76017; Clifford W. Clapp, 5412 Hidden Oaks La., Arlington, TX (US) 76017

( * ) Notice: Subject to any disclaimer, the term of this patent is extended or adjusted under 35 U.S.C. 154(b) by 0 days.

(21) Appl. No.: 09/613,019

(22) Filed: Jul. 10, 2000

(51) Int. Cl.[7] .................................................. E04H 6/00
(52) U.S. Cl. ..................................... 52/79.1; 52/745.02
(58) Field of Search ........................ 52/79.1, DIG. 11, 52/DIG. 3, 745.2, 745.01

(56) References Cited

U.S. PATENT DOCUMENTS

| | | | | |
|---|---|---|---|---|
| 2,834,599 A | * | 5/1958 | Sarchet ......................... | 280/30 |
| 3,818,653 A | * | 6/1974 | Williams ........................ | 52/79 |
| 3,879,050 A | * | 4/1975 | Young ........................... | 280/30 |
| 3,971,174 A | * | 7/1976 | Van der Lely .................. | 52/79 |
| 3,974,602 A | * | 8/1976 | Pohl et al. ..................... | 52/90 |

\* cited by examiner

Primary Examiner—Carl D. Friedman
Assistant Examiner—Naoko Slack
(74) Attorney, Agent, or Firm—Charles W McHugh (57) ABSTRACT

Apparatus and method for constructing at a given site a building having a predetermined shape with a periphery that is essentially defined by a width and a length, and the building having generally vertical walls. At a second site creating an upright structure having an interior bounded by spaced-apart and generally vertical walls but no floor, the separation of said walls serving to define an empty shell whose size and shape corresponds to that of the building that is to be constructed. Connecting horizontal beams to the interior of the upright structure so that they and the upright structure can be lifted. Positioning inside the upright structure a trailer that has the necessary load capacity to transport the upright structure over a public road. Temporarily connecting the trailer to the horizontal beams and transporting the upright structure to the first site. Disconnecting the trailer from the upright structure and removing the trailer from the interior of the upright structure. Subsequently lowering the upright structure toward the top of the foundation. Adjusting, as necessary, the relative position of the upright structure with respect to the foundation by moving the upright structure horizontally immediately prior to achieving load-bearing contact with the foundation—using wheels that are attached to the beams and that can rotate 360 degrees about a vertical axis.

5 Claims, 9 Drawing Sheets

METAL-FRAMED, FACTORY-ASSEMBLED, AND ROAD-TRANSPORTABLE BUILDING HAVING NO FLOOR, AND THE METHOD OF TRANSPORTING THE SAME

FIELD OF THE INVENTION

This invention relates generally to the fabrication of a metal-framed building at a factory, said building initially having no floor; and the subsequent transportation of that building to a remote site where it is installed and provided, as desired, with what may be called a "formal" floor. In one embodiment, the building has a size commonly used by a homeowner as a garage—to provide shelter and security for one or more automobiles or other personal vehicles, as well as boats, lawn equipment, recreational vehicles, hobby equipment etc. In a large embodiment, the building may have 2,000 square feet of floor space (or more), and serve as a single-family residence or office, etc.

BACKGROUND OF THE INVENTION

It is common for persons who live in urban areas to want to provide shelter and security for their personal vehicles, including automobiles, trucks, motorcycles, sports/utility vehicles, etc. It is also common for persons to want to provide equivalent shelter and security for their boats, lawn equipment, hobby equipment (e.g., woodworking tools, kilns and molds, photography labs, etc.), dog and/or horse equipment, and other things that are too bulky or considered too messy for in-house storage. To provide such shelter and security, buildings of modest size—commonly called garages—are often constructed as separate buildings adjacent their houses. Many garages are built a short distance from a house at about the same time that a house is being built. But there are also instances in which either time, money, personal preference or nature may dictate that a garage be built at a later time. For example, after a tornado has destroyed a person's house and all outbuildings, the first priority will likely be to move a mobile home onto the property—to provide immediate shelter for people, pets and personal property. Later, a garage may be needed to provide shelter for other things, including building materials and tools, while general rebuilding is taking place.

When plenty of building time is available, a garage may be built in the same manner that many houses are built, i.e., one board at a time—from the ground up. However, when time is of the essence, it is known that there are shortcuts that can be taken by using factory-built modules—using power equipment, jigs and fixtures, warehoused supplies, etc. (A popular thing for many home builders involves the use of prefabricated roof trusses, each of which is built in a factory to specifications that are established by the builder, and each of which is trucked as a unit to a building site.) But so far as is known, factory processes have not been adapted to build complete garages that can be built and set up with the same speed of so-called manufactured housing. It is an object of this invention to adapt the good features of mass-production and standardized manufacturing techniques to the creation of strong, attractive and economical garages and other stand-alone buildings of a similar size.

In another embodiment, a temporary building may be set up on a street, parking lot or other improved surface, for the purpose of providing shelter for governmental or relief agencies (e.g., the Red Cross), while relief work is being conducted after a major storm or the like. Another example of temporary use of a "hard-side" building is for a command center for police and communications workers, when an annual event such as a fair is held on an annual basis at the same location, but the building would interfere with regular use of the terrain if it were left in place year-round. If a larger structure is desired, two or more modules may be built in a factory and then connected together at a site that has been prepared for a residence, church building, or office. Multi-story buildings may also be built with this technique. The only critical requirement is that the final construction site must be accessible by road, because a major part of the invention involves the transportation of what may be called building "shells" over roads that lead to the final construction sites.

Still another object is to shorten the time from start to completion for a steel-framed building that can be built in a desired one of several possible sizes.

These and other other objects will be apparent from a reading of the following specification aid reference to the several sheets of the drawing.

BRIEF DESCRIPTION OF THE SEVERAL FIGURES IN THE DRAWING

FIG. 10 is a schematic representation, similar to FIG. 9, wherein the eventual building is to be a two-story building, and one of the factory-built shells constitutes an upright structure and an attached roof, and the other factory-built shell constitutes the lower story to which is rigidly attached (at its top) the floor for the second story, with the result that both shells have a rigidly attached overhead framework before they are transported over a road to a building foundation;

FIG. 11 schematically illustrates the creation of a foundation by placing together, side by side, a plurality of small concrete slabs in order to assemble a foundation area that is large enough to fit underneath a building and serve as its floor; and FIG. 12 is a schematic illustration of a multi-story building that can be fabricated n accordance with this invention.

BRIEF DESCRIPTION OF THE INVENTION

In brief, the invention involves construction at a factory or the like of a building shell having a predetermined shape. The building shell has a periphery and a width and a length, and it has generally vertical walls. The shell is fabricated so as to essentially define the shape of the building that is to be finalized at a remote construction site. At the remote site there is prepared a generally horizontal area whose size and shape generally matches the periphery of the building that is to be constructed. Of course, this generally horizontal area should have soil characteristics (with suitable drainage, etc.) that are adequate to support the building that is to be built. And the area must be accessible by road, because the building shell will eventually be brought to the site, on a special trailer, as a completed unit. So the construction technique being disclosed herein might not be appropriate for someone who wants the equivalent of a log cabin that is nestled closely among trees in a forest, accessible only by a narrow footpath. If the soil in the area is not naturally supportive, its ability to support the building can be improved by providing a concrete slab (i.e., a conventional foundation) or other improved surface that will function as the floor of the building.

Turning attention back to the factory-like site, the building shell may be described as an upright structure having spaced-apart and generally vertical walls; the walls will include a plurality of studs that preferably are made of steel, and which remain exposed on the interior of the shell, although they are usually covered on the outside of the shell by a waterproof material. At least one door is provided in the upright structure to permit entrance into and exit from the upright structure after it has been placed on top of the generally horizontal area. Unlike other factory-built structures of the prior art, the building shell of this invention has no floor—at this time. (The floor will be provided later as a separate item at the remote construction site.) The upright structure also has an overhead framework that is rigidly connected to the tops of the generally vertical walls, said overhead framework serving to tie together the generally vertical walls and generally rigidify the upright structure. If the upright structure is to serve as the primary structural body of a single-story building, then the overhead framework will include those elements that will serve as the roof of the completed building. On the other hand, if the upright structure is to serve as the lower story of a two-story building, then the overhead framework will be configured so that it can serve as the floor of the second story.

After the upright structure has been completed at the factory-like site, it is ready to be transported to the construction site where a generally horizontal support area has been prepared. To accomplish this, a plurality of horizontal steel beams are positioned inside the building shell and connected at their opposite ends to appropriate ones of the vertical studs in the side walls. Holes that have been pre-punched in the steel studs are sized to receive bolts that will firmly (but only temporarily) connect the horizontal steel beams to the vertical studs of the shell. Hand-crank jacks (that are attached to the steel beams) may then be used to lift the building shell off the floor of the factory. It is preferred that the jacks have casters or small wheels at their bottoms, so that the steel beams can be manipulated, if necessary, to place the building shell exactly where it is wanted on the improved surface. When lifted high enough, a special trailer with conventional rubber tires may be inserted under the horizontal steel beams, said trailer consisting of at least two longitudinal beams that are oriented so as to be parallel to a road on which the building shell is to be transported. A tractor is then attached to the front of the trailer, and the building shell is then transported down a road to the construction site.

When the building shell is suitably positioned over the improved surface, the jacks are elevated again so that the trailer may be pulled forward and out from under the shell. Last-minute adjustments are made (horizontally) in the relative position between the building shell and the improved surface (i.e., the surface that will become the building's floor), and then the shell is lowered until the weight of the shell is completely transferred to the improved surface. The steel transportation beams are then disconnected from the building shell by removing the bolts from the vertical studs, and the building is almost finished. If desired, the building shell may then be permanently connected to the improved surface, using anchor bolts or the like. The interior of the building shell may then be finished out, with paneling or the like, and utilities may then be connected.

If the installation of the building is only to be temporary, i.e., for a month or less, the transportation beams may be stored elsewhere or left nearby. On the day that the building is to be moved, any furniture, equipment or other things that have been in the building are removed, thereby clearing the way for the transportation beams to again be connected to the sidewalls, so that the lifting steps can be repeated.

DETAILED DESCRIPTION OF A PREFERRED EMBODIMENT OF THE INVENTION

Figure 1:
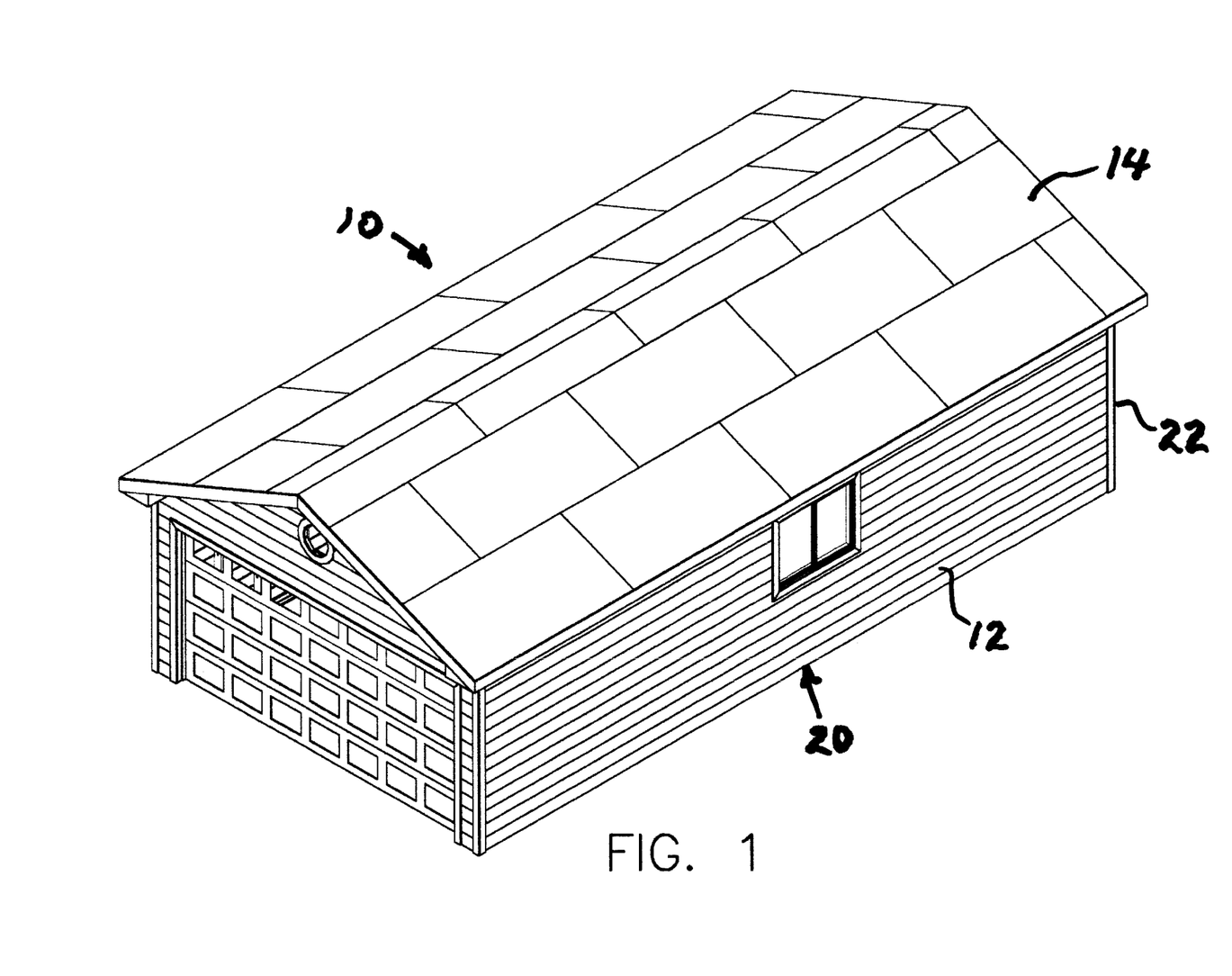
FIG. 1 is a perspective view of an exemplary building that can be construct in accordance with this invention, this particular building being in the shape of a "double-car" garage.

Referring initially to FIG. 1, a completed garage 10 in accordance with this invention is shown in a perspective view, with this exemplary garage having a size of 16 feet wide (from side to side) and 32 feet long (from its front to its rear). Fabrication of the superstructure of the garage preferably takes place within the controlled environment of a factory, and a completely assembled garage is transported over public roads to a construction site where an appropriate foundation has already been prepared. The preferred foundation includes, as a minimum, a generally horizontal area whose size matches that of the "footprint" of the garage that is to built. By use of the term "footprint" it is meant a size and shape that matches the periphery of the garage being assembled at a remote site. To raise the quality of the finished garage, a concrete slab is poured on top of the ground before the garage shell is delivered to the construction site. The top of the concrete slab will eventually constitute the floor of the garage, so no floor is provided in the factory as a part of the manufactured superstructure of the garage.

Figure 2:
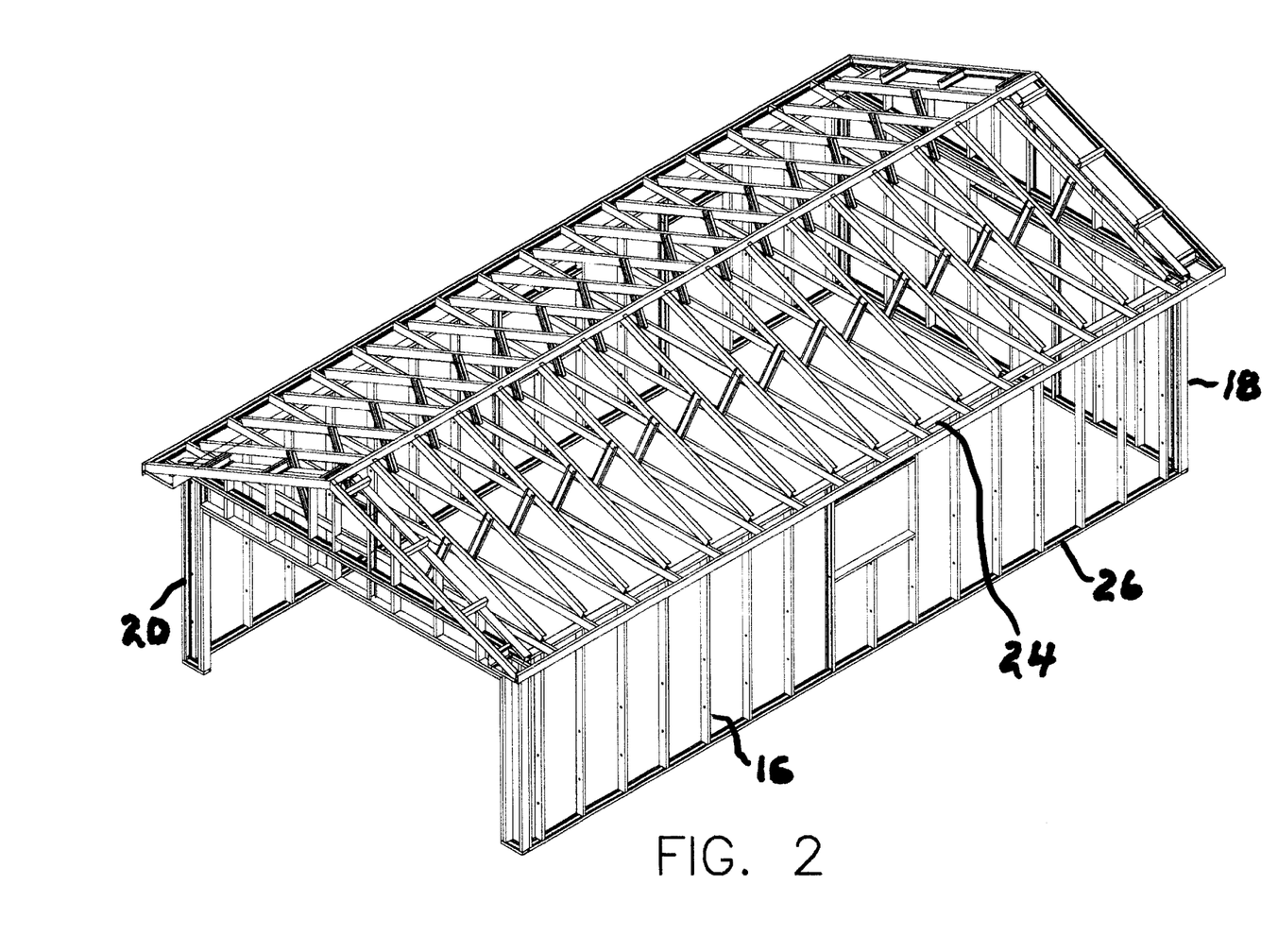
FIG. 2 is a perspective view similar to that of FIG. 1, but showing the metal framework of the building before the siding and roofing materials have been applied—and showing how the building looks during an interim stage of its construction.

Turning additionally to FIG. 2, there is shown a partially completed garage 10 in a perspective view, with many of the exterior elements (i.e., siding 12 and roofing 14) omitted to better show the structural features of the garage's frame. The studs 16 in the three major walls (i.e., two side walls 18, 20 and a rear wall 22) are preferably made of 4 inch steel purlins having a height of about 8 feet, which can be welded at their tops to a horizontal top plate 24, and welded at their bottoms to a horizontal bottom plate 26. Siding planks, windows, doors, and roofing members have been omitted in this figure in order to foster better viewing of the garage's framework, but the omission of any flooring has not been done as a mere illustrative technique. This is because the factory-built superstructure of the new garage has no floor, and none will ever be added—unless, perhaps, a owner someday wants to add an insulating floor of plywood or the like as an option over a "clean" area in the garage, i.e., an area that is not expected to shelter an automobile or other vehicle. Of course, certain building codes and/or personal preferences may dictate that there be some kind of a smooth, hard floor and some kind of anchoring means that secures the garage to the ground. But in accordance with this invention the surface upon which a person normally walks or an automobile is driven (i.e., the floor) that is either needed or required by a building code is provided as a completely separate construction item. Such a floor can even be built by a separate contractor—provided that the contractor builds it to a size and strength specified by a building code and/or as recommended by the garage manufacturer.

Assuming that someone wants a garage that is 16 feet wide and 32 feet long, a concrete contractor will first determine the soil conditions and then build an appropriate foundation for the garage. A typical foundation may include a concrete slab that has peripheral beams and is about 4 inches thick—and which extends to maybe an inch or so inside the perimeter of the garage. The concrete that goes into such a slab can be expected to weigh several thousand pounds—perhaps even 25,000 pounds; but at least this is weight that the garage contractor doesn't have to haul (as an integral part of the garage) over public roads, etc. When a smooth upper surface has been created on the concrete slab, it will be ready to receive the prefabricated garage as soon as the concrete slab has set for the designated period of time—or until it reaches a desired strength. A clear, smooth surface on top of the concrete slab is useful in locating the garage correctly when the right time comes, as will be explained later.

Figure 3:
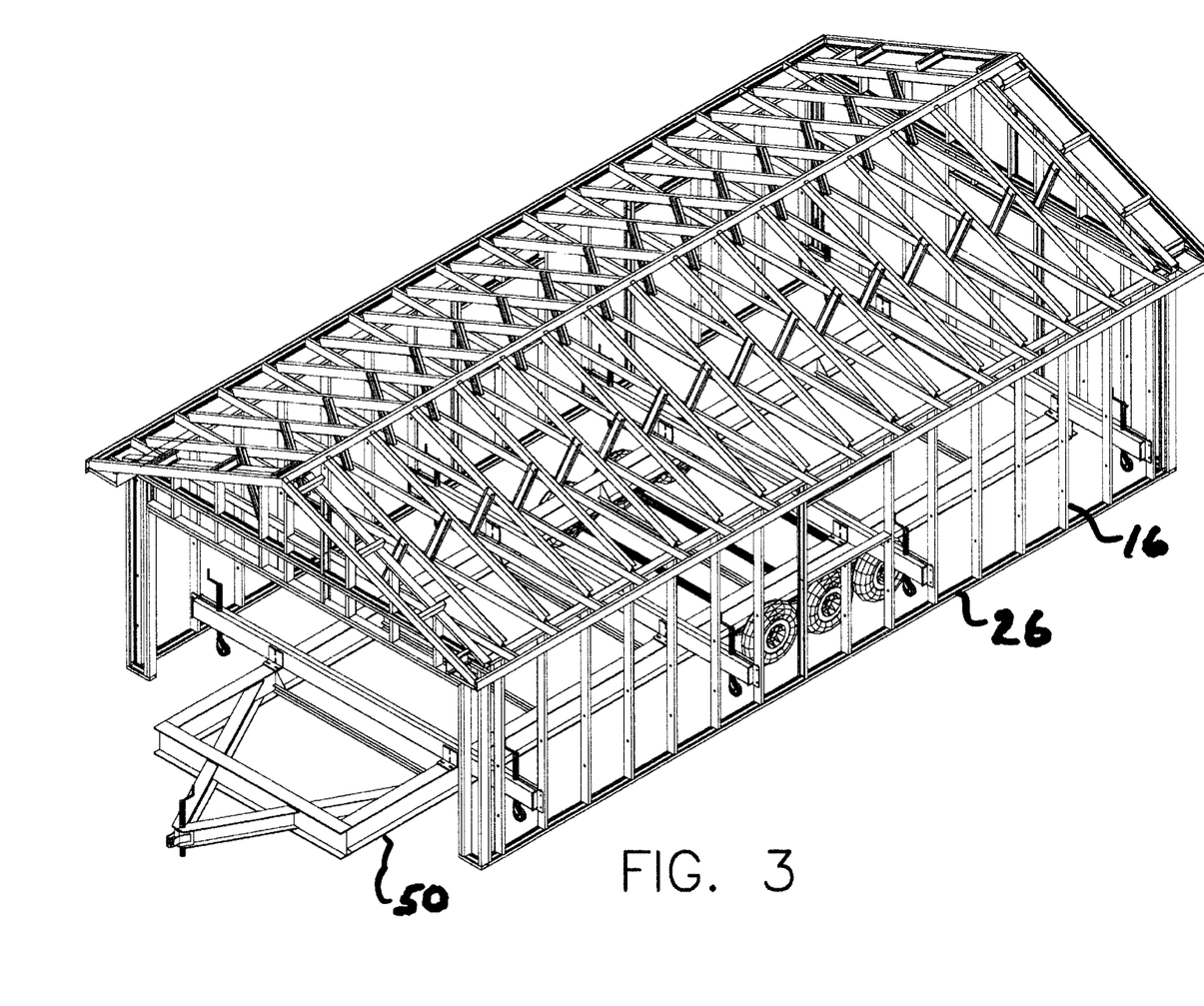
FIG. 3 is a perspective view similar to that of FIG. 2, and showing how a special trailer is positioned within the floor-less building at the time that the building is ready to be transported from a factory where it was built—to a remote construction site where the building is to be "set"

Referring additionally to FIG. 3, an artificial view has been created—in the sense that this is a view that would never occur in real time, because this view shows a transportation fixture 40 and a trailer 50 inside the partially completed garage, and these two things would not normally be connected to the garage's framework at this early stage of the manufacturing process. But this view can be advantageously used to show how the transportation fixture (including any desired number of horizontal beams 42) is normally positioned with respect to the garage's framework. Expressed in other words, the garage 10 would normally be completely finished and ready to "hit the road" before the transportation fixture 40 is secured in place. But, of course, when the garage 10 has been finished there will be structural and cosmetic parts that will conceal the transportation fixture 40 in a view such as this; so the fixture is shown connected to the garage's framework at this early stage in order to better illustrate its placement. The transportation fixture 40 (including four horizontal beams 42) and the trailer 50 are shown alone in FIG. 4.

Figure 4:
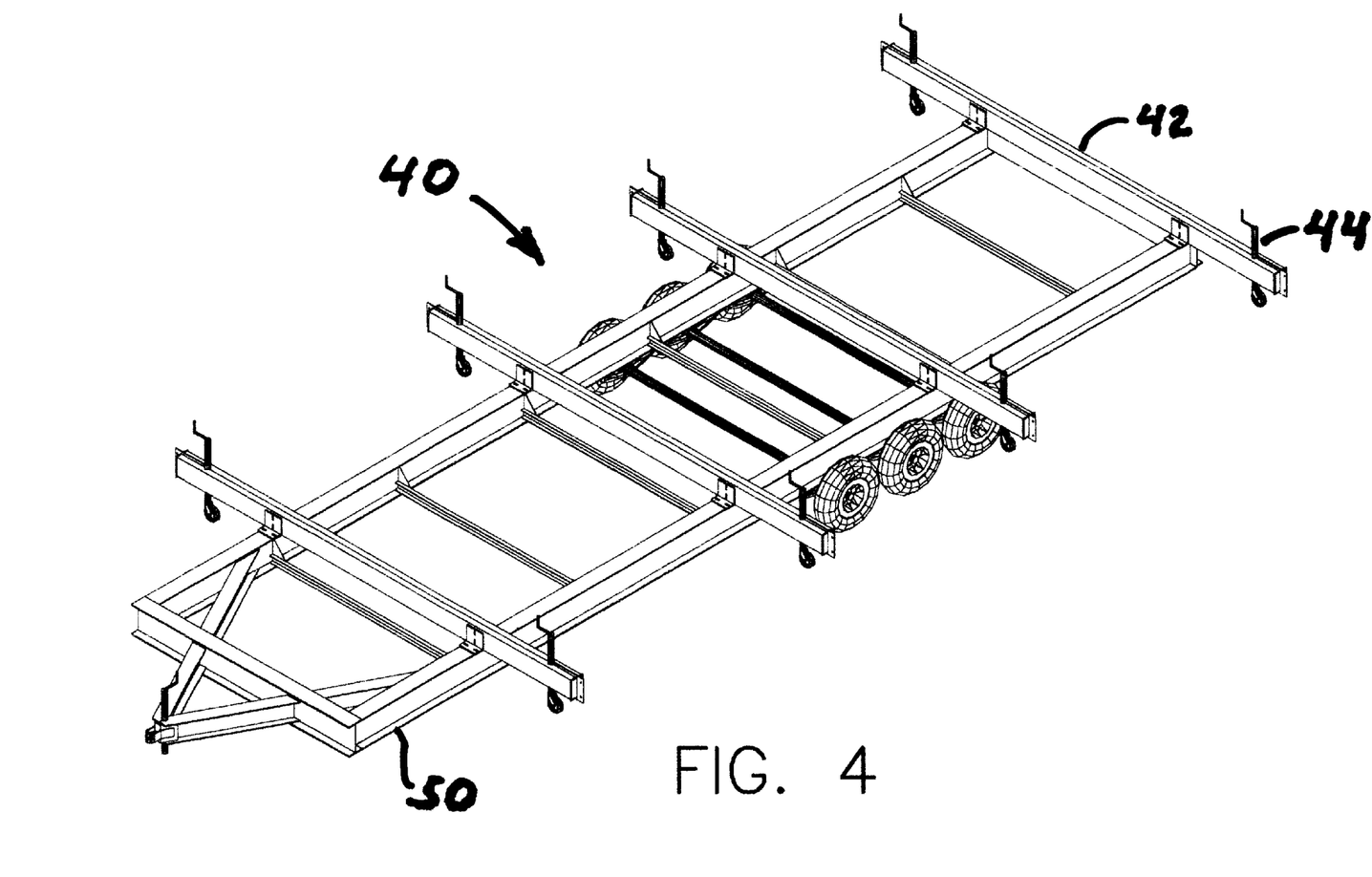
FIG. 4 is a perspective view, at the same scale of FIG. 3, of the special trailer that is shown in its "lift" position in FIG. 3, with four horizontal beams being clearly shown in this particular embodiment, said horizontal beams being selectively connected to the frame of the trailer and above an exemplary set of three pairs of road-worthy wheels and tires.
Figure 5:
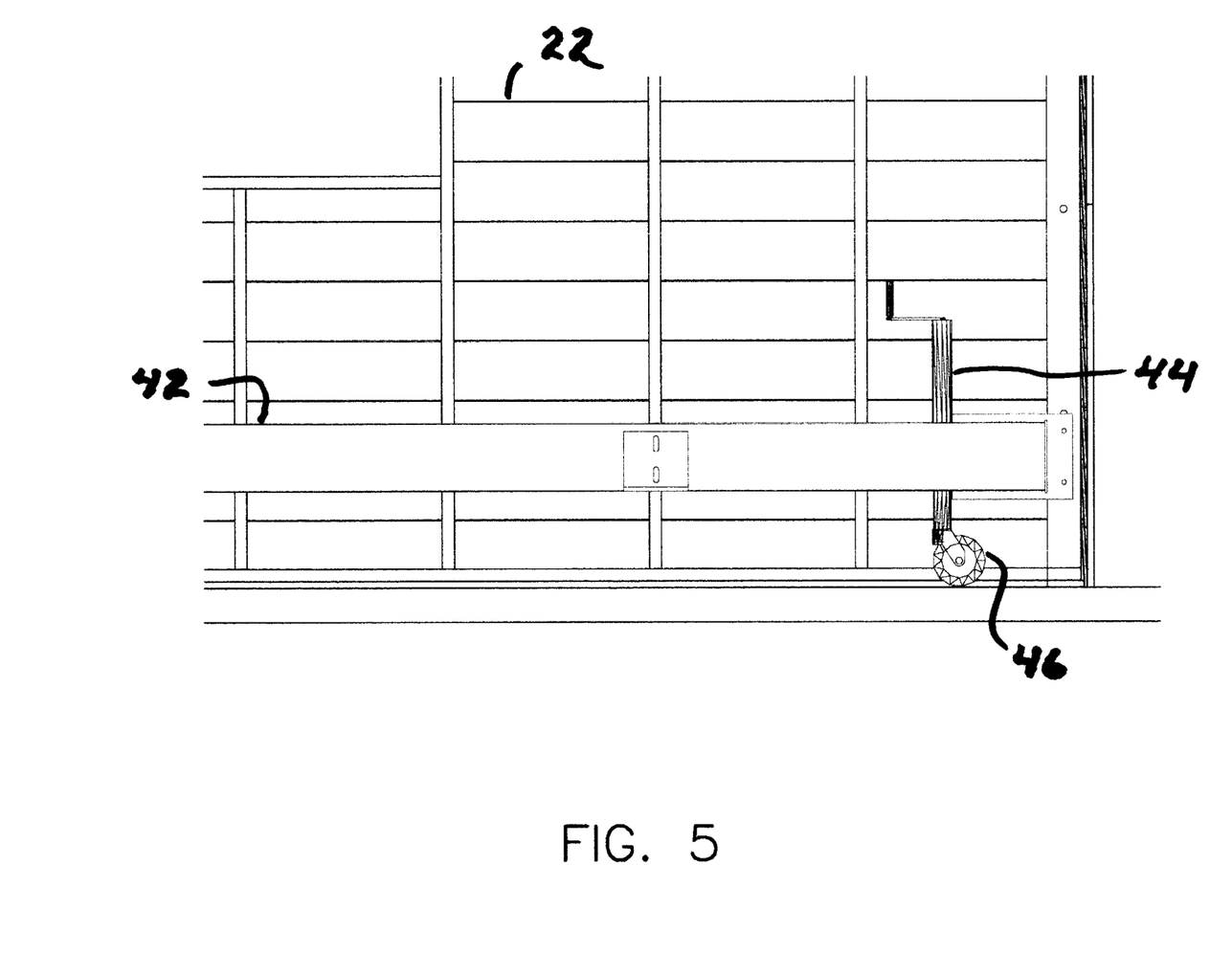
FIG. 5 is a fragmentary elevation view of one horizontal beam attached at its right end (with threaded fasteners) to a vertical stud that forms an integral part of one of the sidewalls, said sidewall (and the rest of the building) being completely static at this time.
Figure 6:
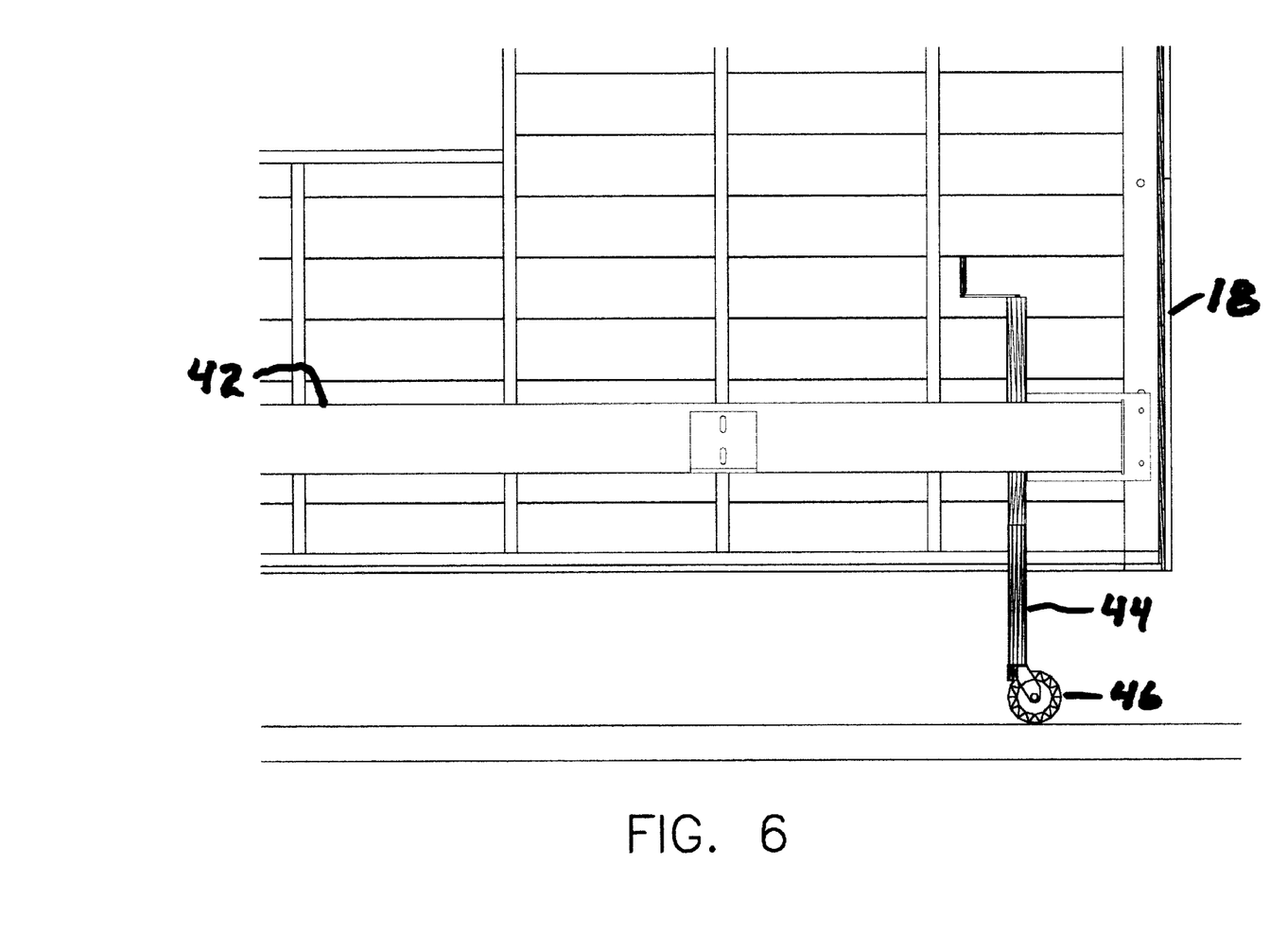
FIG. 6 is a fragmentary elevation view similar to FIG. 5, but showing how the building can be lifted (with the hand jacks) above the floor of the factory in preparation for mating with a trailer that can be rolled into the garage and under the horizontal beams.

The transportation fixture 40 may be described as consisting of a steel structure that is designed to temporarily extend internally of the garage 10—from one side of the garage to the other side. In its preferred mode, the fixture 40 consists of a set of several (e.g., four or more) transverse members 42 that are arranged in a parallel manner and bolted to aligned studs 16 in the garage walls, using relatively short bolts (e.g., ⅝ inch steel bolts that are about two inches long) that pass through previously prepared holes in the vertical studs. The transverse members 42, of course, have two ends; and permanently fixed near each end is a vertically oriented, manually operated lifting device 44. Such a lifting device 44 is shown in FIG. 5. Exemplary lifting devices are 5,000 pound industrial jacks manufactured by Fulton and illustrated in Grainger's Catalog. Several such lifting devices 44 (e.g., eight) are used to lift the entire garage (which may weigh about 7,000 pounds) several inches—to an elevated position with respect to a factory floor, so that a trailer 50 may be moved under the series of transverse members 42. An elevated garage 10 is represented in FIG. 6.

Figure 7:
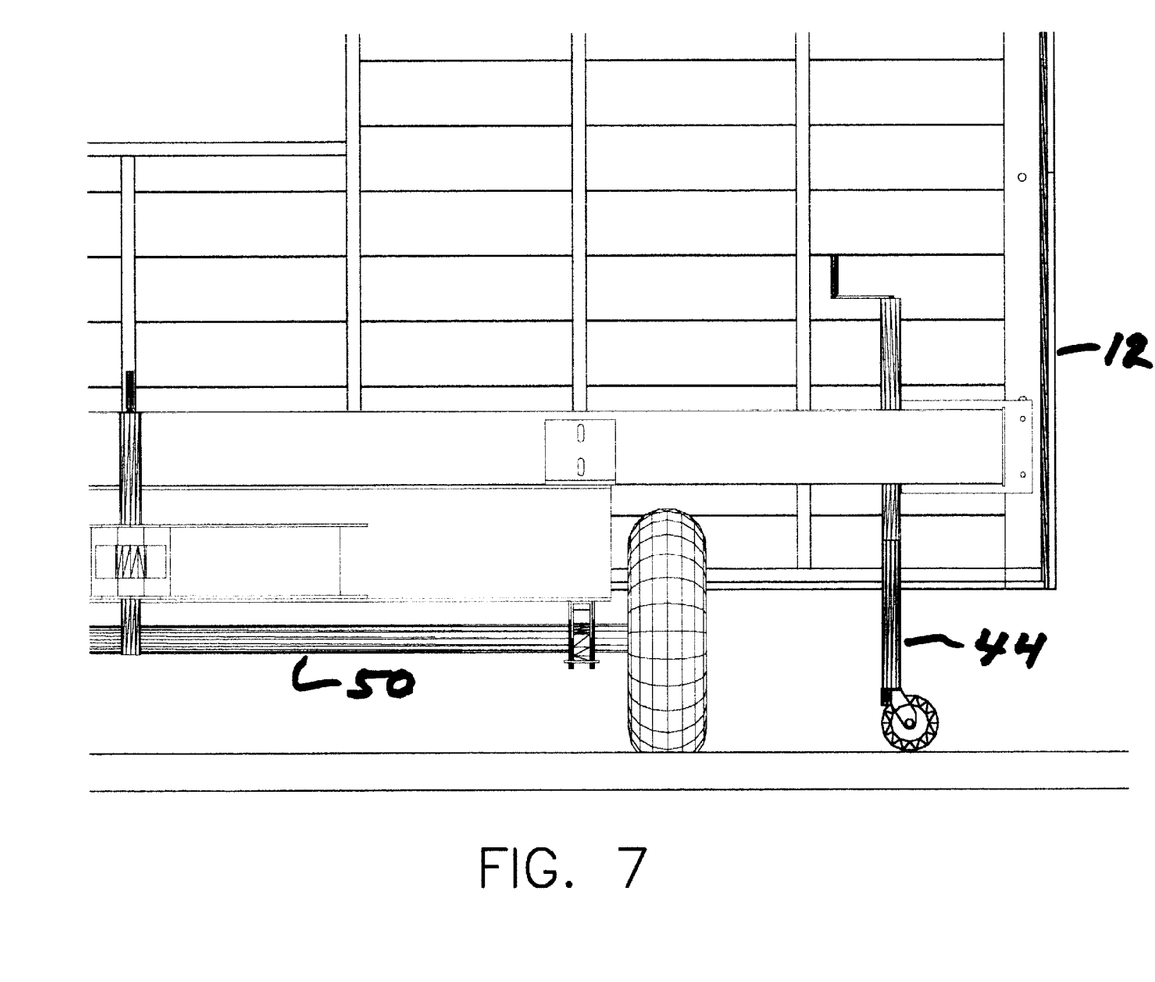
FIG. 7 is an elevation view similar to FIGS. 5 and 6, and showing the spatial relationship between an elevated garage, the horizontal beams that are attached to the garage walls at what may be aptly called "lifting points," and the special purpose trailer for transporting the garage along a road.
Figure 8:
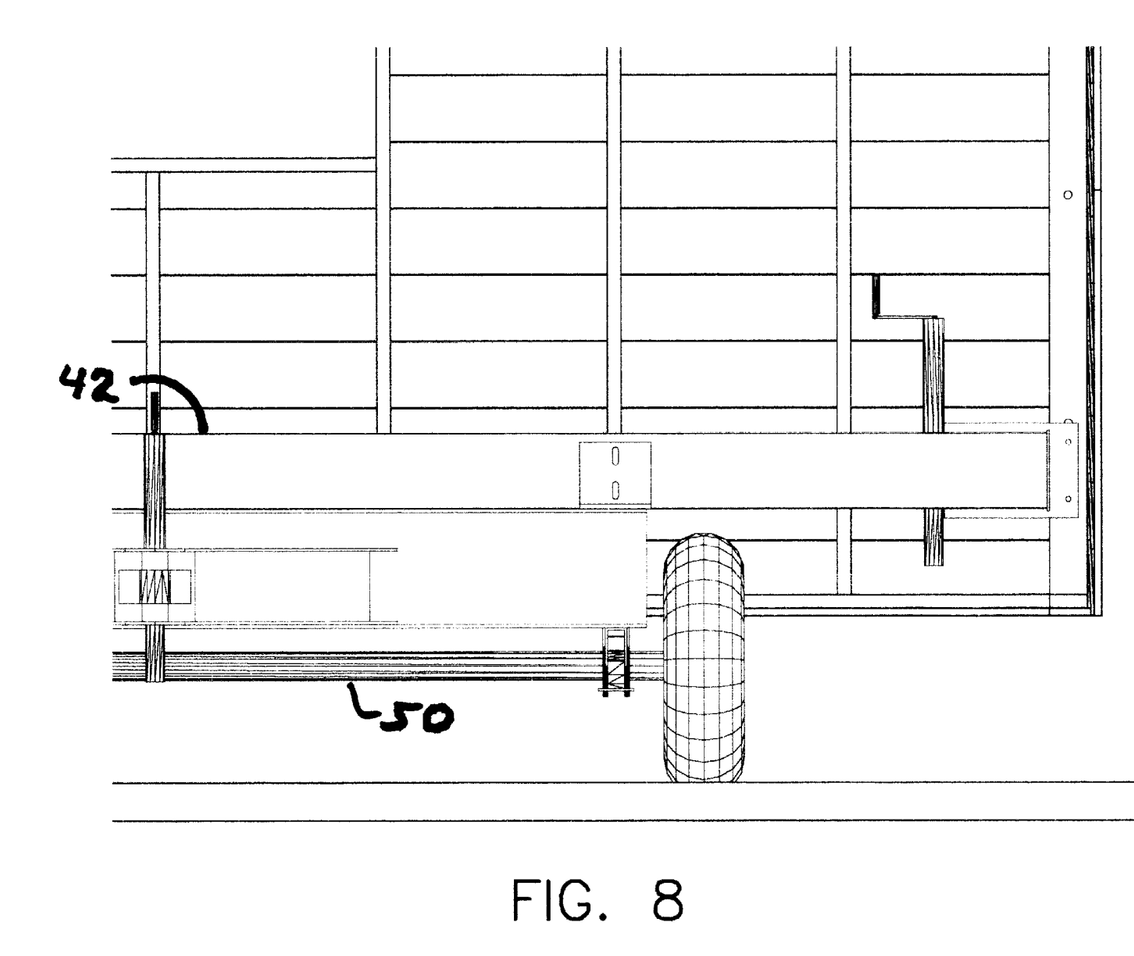
FIG. 8 is an elevation view similar to FIG. 7 and showing the small wheel removed from its installed position at the bottom of the hand jack.

When forklifts are available in the factory, they may also be used to quickly raise the garage 10 to a height that will permit a trailer 50 to be pushed into the garage and positioned centrally under the transverse members 42. The lifting devices are then lowered slightly, so that the weight of the garage will be transferred to the frame of the trailer 50 (through the transverse members 42), and thence to the road through a set of rubber tires. (FIG. 7.) After there is no longer any weight on the lifting devices, the cranks of the lifting devices 44 are turned several more turns (until they reach a height suggested by FIG. 8), so that eventually the small wheels 46 at the bottom of the lifting devices will be lifted off the floor and they can be removed. In this manner, the small wheels 46 will not be at risk of falling off in transit or engaging any part of the road as the trailer 50 is being pulled by a truck or tractor to the building site.

At an appropriate time, which can be after the transverse members 42 have been attached to the side walls of a completed garage, L-shaped steel brackets 48 (with appropriate bolts) are used to securely affix the transverse members 42 to the two longitudinal members of the trailer. Alternatively, the steel brackets 48 may be initially attached to the trailer's longitudinal beams and later connected to transverse members 42. These brackets 48 and their associated bolts ensure that any wind loads on the garage as it moves down a road will not permit any relative movement between the garage 10 and the trailer 50. Of course, permanently welding the brackets 48 to the trailer 50 would be possible, but using nuts and bolts makes them fully adjustable (in a spatial sense) in order to accommodate a variety of different buildings that may need to be transported.

Figure 9:
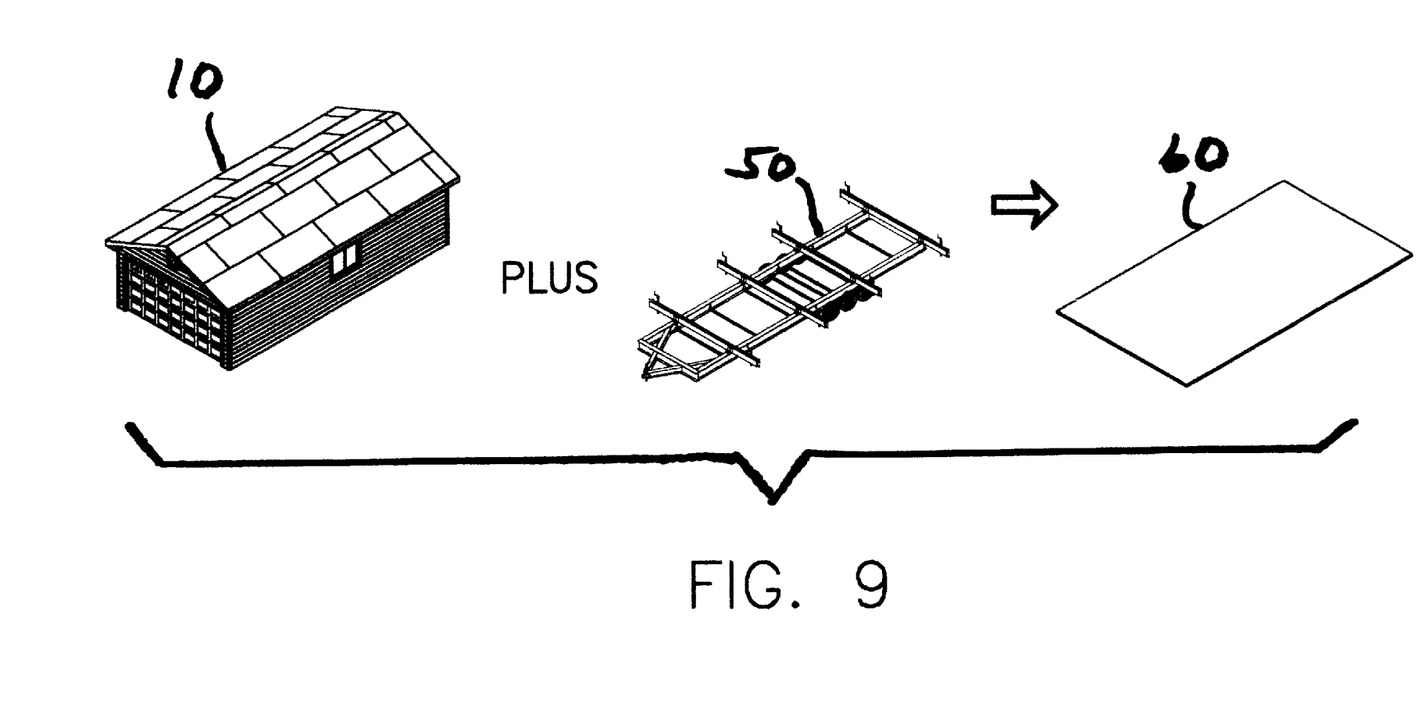
FIG. 9 is a schematic representation, similar to a flow chart, showing the sequence of fabricating the hollow shell of a building at one site, transporting it to a second site on a rigid carrying structure (i.e., a trailer), and placing it on top of a foundation whose upper surface forms the floor for the building.

After the trailer 50 and garage 10 have arrived at the location where the garage is to be installed, the trailer is generally aligned with the center of the concrete slab 60 (FIG. 9) and backed up until the garage is in its final or near-final position. The small wheels 46 are inserted into the downwardly opening tubes of the lifting devices 44, and the bolts that rigidly hold transverse members 42 to the trailer frame are removed. The transverse members 42 (and the attached garage 10) may then be lifted by a small amount, to realize sufficient clearance so that the trailer 50 may be pulled forward—and away from the garage. If perhaps the garage has ended up at a location that is not exactly what is desired, the small wheels 46 make it possible to make small adjustments (horizontally) in the relative position of the garage 10 with respect to the supporting slab 60. Two or three adult workers can normally lean against a garage 10 while it is supported on wheels 46, and move it a few inches forward or backward, or to one side or the other. When the garage 10 is ideally positioned, it is lowered (by turning the cranks on the lifting devices 44) until the garage comes into contact with the top of the slab. Conventional bolts or equivalent fasteners may then be driven through the bottom plate 26 and into the concrete slab 60, and the garage may then be considered to be anchored to the slab—at least until a owner wishes to move it. The transverse members 42 (with wheels removed) are then removed from the interior of the garage and attached to the trailer—for an "empty" trip back to the factory, where they can be used to pick up another garage. For safety, the unloaded trailer may be given a more narrow profile for travel down a highway, by affixing the transverse member in a way so that they are more nearly parallel to the longitudinal members of the trailer instead of perpendicular to those members (as shown in FIG. 4).

If an owner of an installed garage 10 happens to be a construction worker and the time has come to move his or her home—which is a mobile home, the garage can also be moved to a new site by renting a set of transverse members 42 and using them (in connection with, say, a "low boy" trailer) in essentially the reverse manner that they were used to deliver the garage from the factory. Such transverse members 42 could also be used to move a garage 10 a few feet one way or the other on an existing site, as long as there is available space in which to move the garage. That is, the integral strength of the welded steel superstructure of the garage make it possible to pick it up and move it, as long as ground anchors have been temporarily removed. The preferred overhead door on the front of the garage can remain in place at all times, while the garage is being transported for long or short distances.

Another advantage of the disclosed garage is that the preferred siding can be efficiently installed at the factory with air-powered equipment, etc. Siding such as SMART LAP siding can contribute rigidity as the garage is being moved along a highway. But if an owner should want his or her garage delivered as essentially a "skeleton" with a roof and overhead door, and perhaps with siding delivered as a stack of raw material (to be installed later by the owner), the strength of the steel-framed garage would make this possible. Fire-proof and insect-proof siding, such as HAR-DIPLANK siding, can also be used to advantage by those who prefer this material. Galvanized steel studs can also resist rusting in the event that it should rain at the construction site before the siding is installed by an owner In all cases, the manufacturing process described herein contributes to the efficient construction of strong garages (or other buildings) in a protected environment—where rain, snow, wind and temperature extremes do not slow down construction work. Also, when there is a tight labor market, one skilled foreman can simultaneously supervise two or more crews of less-skilled workers in a central factory, as contrasted with having the foreman supervise a single crew when a garage is being built "from the ground up" at a remote construction site.

Turning again to FIG. 9, a foundation for a garage has been illustrated as a single concrete slab 60, which those skilled in the art will recognize can be made by pouring wet concrete into a form that has been placed in contact with the earth's surface. Allowing the concrete to cure will then produce the homogeneous concrete slab that many people would likely deem desirable for a garage floor. FIG. 10 illustrates that a foundation can be prepared by placing together, edge to edge or end to end, a plurality of small concrete slabs, such slabs being commonly sold to support the compressor unit of an air-conditioning system on the outside of a building or residence. If time is of the essence in erecting a building in accordance with this invention, such small slabs may be available when a truck or two of ready-mix concrete cannot be obtained.

Perhaps one other thing should be mentioned, and that is the term "purlin" seems to have both an academic meaning and another meaning in the building trade. The academic meaning can be found in a dictionary—meaning "a timber that supports several rafters at one or more points, or one that supports the roof sheeting directly." Another meaning, and the one that is being used herein, refers to a shaped steel member having a generally C-chaped cross-section, typically made of 16 guage cold-rolled steel, and having a nominal height of 4 inches. Such purlins are widely available, both galvanized and in the red. Indeed, it will often be possible for a contractor to telephone a building supply house and simply ask, "Do you have any purlins?" The question will usually be immediately understood as referring to the steel item being described herein, not its function as a horizontal support in a roof.

While the invention has been primarily described as it relates to a garage, there is no reason why the principles described herein might not be applied to other buildings, including single-family residences, offices, church buildings, etc. Hence, the invention should be interpreted as being being as broad as the claims that are attached hereto.

What is claimed is:

1. The method of constructing at a given site a building having a predetermined shape with a periphery that is essentially defined by a width and a length, and the building having generally vertical walls, comprising the steps of:

a) establishing a generally horizontal area at a first site, said area having a size and shape that matches the periphery of the building that is to be constructed, and said area having soil characteristics that are adequate to support the building that is to be built, and said area being accessible by road;

b) constructing a foundation on top of the generally horizontal area before a building is brought to the first site;

c) at a second site that is remote from the first site creating an upright structure having an interior bounded by spaced-apart and generally vertical walls but no floort, the separation of said walls serving to define an empty shell whose size and shape corresponds to that of the building that is to be constructed, and the upright structure also having an overhead framework that is rigidly connected to the tops of the generally vertical walls, said overhead framework serving to tie together the generally vertical walls and generally rigidify the upright structure, and wherein the upright structure's walls include two spaced-apart and generally parallel side walls having tops and bottoms, d) positioning inside the upright structure at the second site a trailer that has the necessary load capacity to transport the upright structure over a public road;

e) temporarily connecting the trailer to the upright structure in a load-bearing relationship in anticipation of transporting the upright structure to the first site by use of the trailer;

f) transporting the upright structure to the first site and placing it over the foundation, and wherein the upright structure is transported to the first site by temporarily connecting a plurality of horizontal beams between the two side walls at locations adjacent the bottoms of the side walls, and subsequently connecting individual ones of the horizontal beams to the trailer, and subsequently disconnecting the trailer from the upright structure and removing the trailer from the interior of the upright structure;

g) subsequently lowering the upright structure toward the top of the foundation where the structure is installed by lowering the horizontal beams until the bottoms of the walls contact the foundation, and subsequently removing the horizontal beams after the upright structure has been moved to the first site;

h) adjusting, as necessary, the relative position of the upright structure with respect to the foundation by moving the upright structure horizontally immediately prior to achieving load-bearing contact between the lowered upright structure and the foundation; and i) providing at least one door in the upright structure to permit entrance into and exit from the upright structure.

2. The method as claimed in claim 1 wherein the building's side walls include a plurality of permanently affixed steel studs, and wherein the horizontal beams are connected to certain ones of the steel studs in the side walls with selectively removable threaded fasteners.

3. The method as claimed in claim 1 wherein the relative height of the horizontal beams and the trailer is selectively adjustable when the trailer is static, and wherein adjustment of the relative height is accomplished by manipulating a plurality of screw jacks that are attached to the horizontal beams inside the upright structure, and wherein each of the screw jacks has a top and a bottom, and wherein there is a roller attached to the bottom of each of the screw jacks in such a way that each roller can rotate 360 degrees with respect to a longitudinal axis that passes through its associated screw jack, and including the further step of making final horizontal adjustments of the upright structure with respect to the foundation immediately prior to realizing load-bearing contact between the upright structure and the foundation as the upright structure is progressively lowered, and said final horizontal adjustments being made by use of the rollers at the bottom of the screw jacks.

4. The method of constructing a permanently installed building at a given site, comprising the steps of:
   a) fabricating at a first site a building shell with a roof connected thereto, and the building shell having multiple exterior walls that are connected together to define the periphery of the building, and the building shell having no floor while it is still at the first site;
   b) creating at a second site a foundation, said foundation being shaped and sized in order to subsequently rest under the peripheral walls of the building that is to be constructed;
   c) preparing the building for transportation to the second site by temporarily attaching a rigid carrying structure to the multiple walls of the building, said attaching step being accomplished interiorly of the building shell, and subsequently elevating the building shell by lifting it while it is still at the first site;
   d) transporting the building shell to the second site and positioning it above the foundation;
   e) adjusting the relative position of the building shell with respect to the foundation before the building shell is lowered to the foundation, and said adjusting is accomplished by moving the building shell horizontally with respect to the foundation on a wheel-supported structure, said moving including necessary changes in position that include forward and backward and to the right and to the left, and wherein the relative position of the building shell with respect to the foundation is accomplished by manually pushing on the building shell in a horizontal direction while the building shell is supported on wheels that can rotate 360 degrees around a vertical axis;
   f) subsequently lowering the building shell until it makes contact with the foundation after the desired position has been achieved; and
   g) lastly providing a floor for the building, said floor being sized and shaped to rest under the roof.

5. A combination including a factory-built building that is adapted to be moved from the factory where it is built to an installation site where it can be permanently installed, comprising:

a) a building shell including a set of peripheral walls arranged in an edge-to-edge manner so as to define what will be the length and width of the building while the shell is still in the factory, and the walls having a plurality of vertical studs, and wherein the walls have interior and exterior surfaces, and wherein the walls' exterior surfaces are covered with a permanent weather-proof material but the walls' interior surfaces are not covered while the building shell is in the factory, whereby the vertical studs in the walls remain internally exposed while the building shell is in the factory;

b) a roof rigidly connected to the building shell at the factory, such that the walls will be secured against relative movement when the building shell is to be moved from the factory to the installation site;

c) a plurality of lifting points that are accessible from the interior of the shell, said lifting points being rigidly connected to the building shell in order that the entire building shell may be selectively lifted by applying a vertical force on each of the lifting points, and wherein the lifting points include horizontal holes that are provided in certain of the steel studs in a prescribed pattern, and said prescribed pattern matching a hole pattern in ends of a plurality of horizontal beams that can subsequently be connected to a transportation apparatus;

d) a plurality of horizontal beams, each having a length that is sufficient to extend across the width of the building shell, and said beams having ends with holes in a prescribed pattern, and the beams also being selectively connectable to a transportation apparatus for transporting the building shell over a public road;

e) a plurality of threaded fasteners that are sized and shaped to selectively engage the lifting points and connect them in a load-bearing relationship to the plurality of horizontal beams and a transportation apparatus;

f) means independent of the transportation apparatus for raising and lowering the horizontal beams when the horizontal beams are connected to the steel studs in the building shell, whereby the building shell may be raised and lowered when the transportation apparatus is absent; and g) the building shell having no floor while the shell is still in the factory, such that a transportation apparatus may be temporarily rolled into the building shell and rigidly connected to the horizontal beams and hence to the lifting points without creating any spatial interference between the transportation apparatus and parts of the building shell.

* * * * *